Patented Jan. 21, 1936

2,028,189

UNITED STATES PATENT OFFICE 2,028,189

UNDERCOAT FOR LACQUERS AND LACQUERED MATERIAL

Walter D. Bowlby, Wilmington, Del., assignor to Hercules Powder Company, Wilmington, Del., a corporation of Delaware No Drawing. Application October 12, 1932, Serial No. 637,552

9 Claims. (Cl. 91—68)

This invention relates to an improvement in undercoat for lacquers and in lacquered material.

Heretofore it has been known to apply a coating of lacquer, as nitrocellulose lacquer, to the surface of porous papers, carton board and other fibrous or felted fibrous materials, as such or as fabricated into various forms, in order to provide a degree of moisture and grease resistance and to give a gloss to the surface. Heretofore, however, the coating of lacquer has been applied directly to the carton board or other fibrous material and the results have not proved entirely satisfactory, since an excessive quantity of lacquer has been required due to the absorptiveness of the material into which the lacquer penetrates, rendering it difficult to obtain a desired surface coating.

Now, in accordance with this invention, it has been found that an improved lacquer coating may be obtained on materials of the type indicated, as porous paper, carton board, etc., etc., if the material be first sized or undercoated with starch, which will form, in combination with a given amount of lacquer a coating having grease and moisture resistance to a very superior degree and one having a superior gloss.

In addition to affording superior grease and moisture resistance and superior gloss, the use of starch as a size or undercoat in combination with a lacquer will be advantageous in view of the light colored white coating provided by the starch, the fact that starch does not have and will not acquire any bad odor and in that the starch coating or film is not normally objectionably brittle and may be readily plasticized to give a coating or film of desired flexibility.

In carrying this invention into practice, various types of starch may be used. Thus, for example, corn starch, potato starch, wheat starch, etc., etc., may be used, and such may be of a commercial grade, but in order to keep the amount of water in the size, as preferred, at a minimum, it will be desirable to use a starch of low viscosity.

While the size or undercoat, in accordance with this invention, may consist of starch only, it will be desirable to include a softener or plasticizer for the starch, as, for example, glycerol, sulphonated castor oil, mixed esters of carbohydrates, as glucose aceto lactate, etc., etc., in order to make the dried starch film more flexible.

As has been indicated, the starch may be used in widely varying amount as may also the softener or plasticizer. The relative proportions of starch and softener may widely vary and will be dictated by the particular characteristics desired for the size or undercoating with consideration for various applications or uses of the coated material.

Generally speaking, a satisfactory size or undercoating may contain starch 2–25%, a softener 0.5–20% and water 97.5–55%.

As illustrative of the preparation of a size in accordance with this invention, for example, the dry starch is wetted out with cold water and after complete dispersion the mixture is poured slowly and with constant stirring into the desired amount of boiling water. The starch will become completely dissolved after a brief period and the size may then be applied, in any desired manner, as by spraying, brushing, or the like, or more desirably through the medium of a roll by which the starch will be transferred from a container, as a tub or pan, to the surface of the paper or carton board to be sized or undercoated.

Where it be desirable to include in the size a softener, the softener may, for example, be added to and mixed into the solution of starch in water. Alternatively, for example, the softener may be added to the cold water with which the starch is wetted out and the mixture, including the softener, added to boiling water.

As more specifically illustrative of the practical adaptation of this invention, for example, satisfactory undercoatings may be made up on the following formulæ:

| | | | |
|---|---|---|---|
| Starch | 9% | 5% | By wt. |
| Glycerol | 3% | — | " |
| Sulphonated castor oil | — | 2% | " |
| Water | 88% | 93% | " |

The formulæ above may be made up, as described, by wetting out the starch with cold water and dissolving in boiling water, with final addition of the glycerol or sulphonated castor oil, or the softener may be added to the wetting out water and the mixture dissolved in boiling water, or otherwise.

In making up the size or undercoating when a softener is used, it has been found that glycerol is most satisfactory in that it is light colored and free from odor and does not raise the viscosity of the solution.

In combination with the size or undercoating in accordance with this invention, various nitrocellulose lacquers may be used, the particular lacquer most desirable being selected with consideration for the use for which the lacquered material is intended. Thus, for example, where greaseproofness is desired in connection with, for example, carton board, a lacquer in nitrocellulose and proportionally also in a plasticizer, say 66% nitrocellulose, of low viscosity, say of a viscosity of about ½" (Hercules), and 34% plasticizer, will be desirable. Again where a high gloss is desired, the lacquer will be high in resin content, say resin 60%, nitrocellulose 25% and plasticizer 15%. The lacquer may include any suitable solvent mixture, though it desirably will be of such a character that residual odor will be readily eliminated, as, for example, a solvent mixture containing 0–25% methyl ether of glycol, 5–10% acetone and 95–65% ethyl alcohol.

It will be appreciated that the lacquer for application over the size or undercoat for the production of a lacquered surface or article, in accordance with this invention, may be of any known type suitable or previously used for the purpose for which the lacquered material is intended.

In preparing a lacquered material, as, for example, a carton board, or an article fabricated therefrom, the starch undercoat is applied to the carton board and, after the undercoat has dried, the lacquer is applied in any desired manner, as by spraying or brushing.

The term "paper" is used in the claims hereinafter set forth as inclusive of pasteboard, cardboard, cartonboard, and other composite paper materials, which, for the purposes of this invention, are the equivalents of ordinary paper.

What I claim and desire to protect by Letters Patent is:

1. A waterproof, greaseproof and odorless packaging material comprising paper having a surface thereof coated with starch and having a nitrocellulose coating superimposed on said starch coating.

2. A waterproof, greaseproof and odorless packaging material comprising paper having a surface thereof coated with a film including starch and a softener therefor and having a nitrocellulose coating superimposed on said starch coating.

3. A waterproof, greaseproof and odorless packaging material comprising paper having a surface thereof coated with a film including starch and glycerol and having a nitrocellulose coating superimposed on said starch coating.

4. A waterproof, greaseproof and odorless packaging material comprising paper having a surface thereof coated with a film including starch and sulphonated castor oil and having a nitrocellulose coating superimposed on said starch coating.

5. A waterproof, greaseproof and odorless packaging material comprising paper having a surface thereof coated with a film including starch and a softener therefor and having a coating including nitrocellulose and a plasticizer superimposed on said starch coating.

6. A waterproof, greaseproof and odorless packaging material comprising paper having a surface thereof coated with a film including starch and a softener therefor and having a coating including nitrocellulose, a resin and a plasticizer superimposed on said starch coating.

7. A waterproof, greaseproof and odorless packaging material comprising paper having a surface thereof coated with a starch film deposited from a composition consisting of starch 2–25%, a softener for the starch 0.5–20% and water 55–97.5%, and a nitrocellulose coating superimposed on said starch coating.

8. A waterproof, greaseproof and odorless packaging material comprising paper having a surface thereof coated with a starch film consisting of about 75% starch and about 25% glycerol, and a nitrocellulose coating superimposed on said starch coating.

9. A waterproof, greaseproof and odorless packaging material comprising paper having a surface thereof coated with a starch film consisting of about 71% starch and about 29% sulfonated castor oil, and a nitrocellulose coating superimposed on said starch coating.

WALTER D. BOWLBY.